(12) United States Patent
Hopeman, IV et al.

(10) Patent No.: US 9,740,718 B2
(45) Date of Patent: Aug. 22, 2017

(54) AGGREGATING DIMENSIONAL DATA USING DENSE CONTAINERS

(71) Applicant: Oracle International Corporation, Redwood Shores, CA (US)

(72) Inventors: Albert A. Hopeman, IV, Redwood Shores, CA (US); Martin Roth, Redwood Shores, CA (US); Ekrem S. C. Soylemez, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 80 days.

(21) Appl. No.: 14/033,251

(22) Filed: Sep. 20, 2013

(65) Prior Publication Data

US 2015/0088885 A1 Mar. 26, 2015

(51) Int. Cl.
*G06F 17/30* (2006.01)

(52) U.S. Cl.
CPC .............. *G06F 17/30315* (2013.01)

(58) Field of Classification Search
CPC ......... G06F 17/30312; G06F 17/30592; G06F 2216/03; G06F 17/30433; G06F 17/30448
USPC .................................................. 707/714, 600
See application file for complete search history.

(56) References Cited

U.S. PATENT DOCUMENTS

| | | | |
|---|---|---|---|
| 5,359,724 A | 10/1994 | Earle | |
| 5,848,408 A | 12/1998 | Jakobsson | |
| 5,905,985 A | 5/1999 | Malloy | |
| 5,943,666 A * | 8/1999 | Kleewein | G06F 17/30463 |
| 5,960,428 A | 9/1999 | Lindsay | |
| 6,298,342 B1 * | 10/2001 | Graefe | G06F 17/30595 |
| | | | 707/602 |
| 6,317,750 B1 | 11/2001 | Tortolani et al. | |
| 6,341,281 B1 * | 1/2002 | MacNicol | G06F 17/30451 |
| 6,345,267 B1 * | 2/2002 | Lohman | G06F 17/30463 |
| 6,353,828 B1 | 3/2002 | Ganesh | |
| 6,385,604 B1 | 5/2002 | Bakalash et al. | |
| 6,397,195 B1 | 5/2002 | Pinard et al. | |

(Continued)

OTHER PUBLICATIONS

U.S. Appl. No. 13/587,897, filed Aug. 16, 2012, Office Action, Nov. 25, 2013.

(Continued)

*Primary Examiner* — Sheree Brown
(74) *Attorney, Agent, or Firm* — Hickman Palermo Becker Bingham LLP

(57) ABSTRACT

Methods, computer systems, and stored instructions are described herein for densely grouping dimensional data and/or aggregating data using a data structure, such as one that is constructed based on dimensional data. When smaller tables are joined with a larger table, a server may analyze the smaller tables first to determine actual value combinations that occur in the smaller tables, and these actual value combinations are used to more efficiently process the larger table. A dense data structure may be generated by processing dimensional data before processing data from fact table. The dense data structure may be generated by compressing ranges of values that are possible in dimensions into a range of values that actually occurs in the dimensions. The compressed range of values may be represented by dense set identifiers rather than the actual compressed range of values.

26 Claims, 7 Drawing Sheets

DATA STRUCTURE 208

PROD TABLE 204

| MFG | CAT | SUBCAT | PID |
|---|---|---|---|
| GE | APPLIANCE | WASHER | 4 |
| GE | APPLIANCE | DRYER | 3 |
| ... | ... | ... | ... |
| GE | ELECTRIC | BULB | 8 |
| GE | ELECTRIC | SWITCH | 6 |
| ... | ... | ... | ... |

GEOG TABLE 206

| COUNTRY | STATE | CITY | GID |
|---|---|---|---|
| USA | WA | SEATTLE | 2 |
| USA | WA | SPOKANE | 3 |
| ... | ... | ... | ... |
| USA | CA | SF | 7 |
| USA | CA | LA | 8 |
| ... | ... | ... | ... |

SALES TABLE 202

| TID | GID | PID | QTY | DSIP |
|---|---|---|---|---|
| 1 | 2 | 8 | 50 | 1 |
| 2 | 3 | 4 | 12 | 1 |
| 3 | 6 | 8 | 40 | ... |
| 4 | 6 | 6 | 30 | 2 |
| 5 | 7 | 6 | 35 | ... |
| 6 | 8 | 3 | 8 | 2 |
| 7 | 2 | 6 | 40 | DSIG |
| 8 | 1 | 5 | 6 | 1 |
| 9 | 7 | 8 | 60 | 1 |
| 10 | 2 | 8 | 20 | ... |
| 11 | 7 | 8 | 45 | 2 |
| 12 | ... | ... | ... | 2 |

STORAGE DEVICE(S) 200    DATA STRUCTURE 210

(56) References Cited

U.S. PATENT DOCUMENTS

| | | |
|---|---|---|
| 6,397,204 B1 | 5/2002 | Liu |
| 6,405,208 B1 | 6/2002 | Raghavan et al. |
| 6,446,063 B1 | 9/2002 | Chen |
| 6,460,045 B1 | 10/2002 | Aboulnaga et al. |
| 6,484,179 B1 | 11/2002 | Roccaforte |
| 6,529,896 B1 | 3/2003 | Leung et al. |
| 6,618,729 B1 | 9/2003 | Bhashyam et al. |
| 6,711,563 B1* | 3/2004 | Koskas .................. 707/769 |
| 6,775,682 B1* | 8/2004 | Ballamkonda .... G06F 17/30489 |
| 6,959,304 B1 | 10/2005 | Teig et al. |
| 6,965,891 B1 | 11/2005 | Jakobsson |
| 7,028,046 B2 | 4/2006 | Anjur et al. |
| 7,324,991 B1 | 1/2008 | Anjur |
| 7,337,163 B1 | 2/2008 | Srinivasan |
| 7,366,730 B2 | 4/2008 | Greenfield et al. |
| 7,392,248 B2* | 6/2008 | Bakalash .......... C03B 37/02718 |
| 7,467,127 B1 | 12/2008 | Baccash et al. |
| 7,617,312 B2 | 11/2009 | Tummalapalli |
| 7,725,425 B2 | 5/2010 | Smartt |
| 7,734,652 B2 | 6/2010 | Tamayo |
| 7,769,733 B2 | 8/2010 | Chen et al. |
| 7,774,303 B2 | 8/2010 | Shoup |
| 7,797,320 B2 | 9/2010 | Thomsen |
| 8,001,112 B2 | 8/2011 | Dombroski et al. |
| 8,041,670 B2* | 10/2011 | Bakalash .......... G06F 17/30489 707/603 |
| 8,200,612 B2 | 6/2012 | Soylemez |
| 8,209,208 B2 | 6/2012 | Lipasek et al. |
| 8,311,975 B1 | 11/2012 | Gonsalves |
| 8,554,761 B1 | 10/2013 | Ahmed |
| 8,788,453 B2* | 7/2014 | Bakalash .......... G06F 17/30489 707/603 |
| 8,799,209 B2* | 8/2014 | Bakalash .......... G06F 17/30489 707/603 |
| 9,183,254 B1 | 11/2015 | Cole |
| 2002/0095397 A1* | 7/2002 | Koskas ............................. 707/1 |
| 2002/0095421 A1* | 7/2002 | Koskas ........................ 707/100 |
| 2003/0131215 A1 | 7/2003 | Bellew |
| 2003/0208484 A1* | 11/2003 | Chang ............... G06F 17/30463 |
| 2004/0153435 A1* | 8/2004 | Gudbjartsson et al. .......... 707/1 |
| 2004/0225639 A1 | 11/2004 | Jakobsson |
| 2004/0236786 A1 | 11/2004 | Medicke |
| 2005/0033741 A1 | 2/2005 | Dombroski et al. |
| 2006/0026115 A1 | 2/2006 | Ahmed |
| 2006/0101001 A1 | 5/2006 | Lindsay |
| 2006/0184519 A1 | 8/2006 | Smartt |
| 2006/0235823 A1 | 10/2006 | Chong |
| 2007/0027860 A1 | 2/2007 | Bestgen |
| 2007/0083489 A1 | 4/2007 | Lawande |
| 2007/0233648 A1 | 10/2007 | Zuzarte |
| 2007/0239673 A1 | 10/2007 | Barsness |
| 2007/0250473 A1 | 10/2007 | Larson |
| 2008/0059415 A1* | 3/2008 | Bakalash .......... G06F 17/30489 |
| 2008/0172354 A1 | 7/2008 | Zuzarte |
| 2008/0215544 A1 | 9/2008 | Galindo-Legaria |
| 2009/0112793 A1 | 4/2009 | Ahmed |
| 2009/0182720 A1 | 7/2009 | Cain et al. |
| 2009/0265335 A1 | 10/2009 | Hoffman |
| 2009/0281985 A1 | 11/2009 | Aggarwal |
| 2010/0299337 A1 | 11/2010 | Aurin |
| 2010/0299367 A1* | 11/2010 | Chakrabarti et al. ......... 707/803 |
| 2011/0040745 A1 | 2/2011 | Zaydman |
| 2011/0055246 A1 | 3/2011 | Le Biannic et al. |
| 2011/0137917 A1 | 6/2011 | Boland et al. |
| 2011/0145244 A1 | 6/2011 | Kim et al. |
| 2011/0173164 A1 | 7/2011 | Bendel |
| 2011/0196857 A1 | 8/2011 | Chen |
| 2011/0282864 A1 | 11/2011 | Collins |
| 2012/0296942 A1 | 11/2012 | Arora |
| 2013/0006965 A1 | 1/2013 | Barbas |
| 2013/0060547 A1 | 3/2013 | Beran et al. |
| 2013/0117255 A1* | 5/2013 | Liu .................. G06F 17/30592 707/714 |
| 2013/0173528 A1* | 7/2013 | Betawadkar-Norwood .......... G06F 17/30451 707/602 |
| 2013/0198165 A1 | 8/2013 | Cheng |
| 2013/0275364 A1 | 10/2013 | Wang |
| 2013/0275367 A1 | 10/2013 | Shuma |
| 2014/0095502 A1 | 4/2014 | Ziauddin |
| 2014/0095534 A1 | 4/2014 | Aingaran |
| 2014/0101201 A1 | 4/2014 | Yan |
| 2014/0181072 A1 | 6/2014 | Wong |
| 2014/0214796 A1 | 7/2014 | Barber |
| 2014/0372438 A1 | 12/2014 | Chandramouli |
| 2015/0088795 A1 | 3/2015 | Golovashkin et al. |
| 2015/0088809 A1 | 3/2015 | Kociubes et al. |
| 2015/0088856 A1 | 3/2015 | Hunter et al. |
| 2015/0088919 A1 | 3/2015 | Hunter et al. |

OTHER PUBLICATIONS

U.S. Appl. No. 14/033,271, filed Sep. 20, 2015, Office Action, Jul. 21, 2015.
U.S. Appl. No. 13/587,897, filed Aug. 16, 2012, Notice of Allowance, Apr. 7, 2014.
U.S. Appl. No. 14/033,285, filed Sep. 20, 2013, Final Office Action, May 10, 2016.
U.S. Appl. No. 14/033,271, filed Sep. 20, 2013, Final Office Action, Mar. 15, 2016.
U.S. Appl. No. 14/033,358, filed Sep. 20, 2013, Final Office Action, Oct. 5, 2016.
U.S. Appl. No. 14/033,358, filed Sep. 20, 2013, Advisory Action, Jan. 19, 2017.
Kociubes, U.S. Appl. No. 14/033,271, filed Sep. 20, 2013, Interview Summary, Jan. 30, 2017.
Hunter, U.S. Appl. No. 14/033,358, filed Sep. 20, 2013, Interview Summary, Dec. 21, 2016.
U.S. Appl. No. 10/944,169, filed Sep. 16, 2004, Notice of Allowance, Sep. 30, 2013.
U.S. Appl. No. 14/033,358, filed Sep. 20, 2013, Office Action, Apr. 6, 2016.
U.S. Appl. No. 14/033,285, filed Sep. 20, 2013, Interview Summary, Jun. 17, 2016.
U.S. Appl. No. 14/033,271, filed Sep. 20, 2013, Interview Summary, Aug. 18, 2016.
Kociubes, U.S. Appl. No. 14/033,271, filed Sep. 20, 2013, Final Office Action, Apr. 12, 2017.
Hunter, U.S. Appl. No. 14/033,358, filed Sep. 20, 2013, Office Action, Mar. 9, 2017.
Hunter, U.S. Appl. No. 14/033,285, filed Sep. 20, 2013, Final Office Action, Feb. 22, 2017.

* cited by examiner

FIGURE 1

PROD TABLE 104

| MFG | CAT | SUBCAT | PID |
|---|---|---|---|
| GE | APPLIANCE | WASHER | 4 |
| GE | APPLIANCE | DRYER | 3 |
| ... | ... | ... | ... |
| GE | ELECTRIC | BULB | 8 |
| GE | ELECTRIC | SWITCH | 6 |
| ... | ... | ... | ... |

SALES TABLE 102

| TID | GID | PID | QTY |
|---|---|---|---|
| 1 | 2 | 8 | 50 |
| 2 | 3 | 4 | 12 |
| 3 | 6 | 8 | 40 |
| 4 | 6 | 6 | 30 |
| 5 | 7 | 6 | 35 |
| 6 | 8 | 3 | 8 |
| 7 | 2 | 6 | 40 |
| 8 | 1 | 5 | 6 |
| 9 | 7 | 8 | 60 |
| 10 | 2 | 8 | 20 |
| 11 | 7 | 8 | 45 |
| 12 | ... | ... | ... |

GEOG TABLE 106

| COUNTRY | STATE | CITY | GID |
|---|---|---|---|
| USA | WA | SEATTLE | 2 |
| USA | WA | SPOKANE | 3 |
| ... | ... | ... | ... |
| USA | CA | SF | 7 |
| USA | CA | LA | 8 |
| ... | ... | ... | ... |

STORAGE DEVICE(S) 100

PRIOR ART

FIGURE 2

DATA STRUCTURE 208

PROD TABLE 204

| MFG | CAT | SUBCAT | PID |
|---|---|---|---|
| GE | APPLIANCE | WASHER | 4 |
| GE | APPLIANCE | DRYER | 3 |
| ... | ... | ... | ... |
| GE | ELECTRIC | BULB | 8 |
| GE | ELECTRIC | SWITCH | 6 |
| ... | ... | ... | ... |

SALES TABLE 202

| TID | GID | PID | QTY | DSIP |
|---|---|---|---|---|
| 1 | 2 | 8 | 50 | 1 |
| 2 | 3 | 4 | 12 | 1 |
| 3 | 6 | 8 | 40 | ... |
| 4 | 6 | 6 | 30 | 2 |
| 5 | 7 | 6 | 35 | ... |
| 6 | 8 | 3 | 8 | 2 |
| 7 | 2 | 6 | 40 | |
| 8 | 1 | 5 | 6 | |
| 9 | 7 | 8 | 60 | |
| 10 | 2 | 8 | 20 | |
| 11 | 7 | 8 | 45 | |
| 12 | ... | ... | ... | |

GEOG TABLE 206

| COUNTRY | STATE | CITY | GID |
|---|---|---|---|
| USA | WA | SEATTLE | 2 |
| USA | WA | SPOKANE | 3 |
| ... | ... | ... | ... |
| USA | CA | SF | 7 |
| USA | CA | LA | 8 |
| ... | ... | ... | ... |

DATA STRUCTURE 210

| DSIG | |
|---|---|
| 1 | |
| 1 | |
| ... | |
| 2 | |
| 2 | |
| ... | |

STORAGE DEVICE(S) 200

FIGURE 3

STORAGE DEVICE(S) 300

SALES TABLE 302

| TID | GID | PID | QTY |
|-----|-----|-----|-----|
| 1   | 2   | 8   | 50  |
| 2   | 3   | 4   | 12  |
| 3   | 6   | 8   | 40  |
| 4   | 6   | 6   | 30  |
| 5   | 7   | 6   | 35  |
| 6   | 8   | 3   | 8   |
| 7   | 2   | 6   | 40  |
| 8   | 1   | 5   | 6   |
| 9   | 7   | 8   | 60  |
| 10  | 2   | 8   | 20  |
| 11  | 7   | 8   | 45  |
| 12  | ... | ... | ... |

PROD TABLE 304

| MFG | CAT       | ... | PID | DSIP |
|-----|-----------|-----|-----|------|
| GE  | APPLIANCE | ... | 4   | 1    |
| GE  | APPLIANCE | ... | 3   | 1    |
| ... | ...       | ... | ... | ...  |
| GE  | ELECTRIC  | ... | 8   | 2    |
| GE  | ELECTRIC  | ... | 6   | 2    |
| ... | ...       | ... | ... | ...  |

GEOG TABLE 306

| COUNTRY | STATE | ... | GID | DSIG |
|---------|-------|-----|-----|------|
| USA     | WA    | ... | 2   | 1    |
| USA     | WA    | ... | 3   | 1    |
| ...     | ...   | ... | ... | ...  |
| USA     | CA    | ... | 7   | 2    |
| USA     | CA    | ... | 8   | 2    |
| ...     | ...   | ... | ... | ...  |

DATA STRUCTURE 308

| RIDP | DSIP |
|------|------|
| 3    | 1    |
| 4    | 1    |
| ...  | ...  |
| 6    | 2    |
| ...  | ...  |
| 8    | 2    |

DATA STRUCTURE 310

| RIDG | DSIG |
|------|------|
| 2    | 1    |
| 3    | 1    |
| ...  | ...  |
| 7    | 2    |
| 8    | 2    |
| ...  | ...  |

FIGURE 4

STORAGE DEVICE(S) 400

SALES TABLE 402

| TID | GID | PID | QTY |
|-----|-----|-----|-----|
| 1 | 2 | 8 | 50 |
| 2 | 3 | 4 | 12 |
| 3 | 6 | 8 | 40 |
| 4 | 6 | 6 | 30 |
| 5 | 7 | 6 | 35 |
| 6 | 8 | 3 | 8 |
| 7 | 2 | 6 | 40 |
| 8 | 1 | 5 | 6 |
| 9 | 7 | 8 | 60 |
| 10 | 2 | 8 | 20 |
| 11 | 7 | 8 | 45 |
| 12 | ... | ... | ... |

DATA STRUCTURE 408

| RIDP | DSIP |
|------|------|
| 3 | 1 |
| 4 | 1 |
| ... | ... |
| 6 | 2 |
| ... | ... |
| 8 | 2 |

DATA STRUCTURE 410

| RIDG | DSIG |
|------|------|
| 2 | 1 |
| 3 | 1 |
| ... | ... |
| 7 | 2 |
| 8 | 2 |
| ... | ... |

DATA STRUCTURE 412A

| DSIP | 1 | 2 |
|------|---|---|
| DSIG | | |
| 1 | 12 | 110 |
| 2 | 8 | 140 |

DATA STRUCTURE 412B

| DSIP | 1 | 2 |
|------|---|---|
| DSIG | | |
| 1 | 12 | 50, 40, 20 |
| 2 | 8 | 35, 60, 45 |

AGGREGATING DIMENSIONAL DATA USING DENSE CONTAINERS

CROSS-REFERENCE TO RELATED APPLICATIONS

The present application is related to U.S. patent application Ser. No. 14/033,285 entitled "Inferring Dimensional Metadata From Content Of A Query", Ser. No. 14/033,358 entitled "Transforming A Query To Reuse Stored Data", and Ser. No. 14/033,271 entitled "Densely Grouping Dimensional Data", filed Sep. 20, 2013, the entire contents of which are incorporated by reference as if fully set forth herein.

TECHNICAL FIELD

The technical field relates to densely grouping and aggregating dimensional data.

BACKGROUND

Storing Multidimensional Data

Database systems are often designed to maintain huge amounts of information about a variety of entities, events, or occurrences (referred to generally as occurrences), and these occurrences may be described by a variety of characteristics. Even database systems that do not yet contain huge amounts of information are often designed to be scalable such that the database systems can be adapted to accommodate huge amounts of information. Huge tables, which may include every occurrence and every characteristic of every occurrence, may be impossible to analyze if there are not enough resources to store and process significant portions of these tables. Even if sufficient resources are available, storing and processing significant portions of these huge tables can be quite costly. As a result, when occurrences have many characteristics or are otherwise related to a variety of information, many database systems separate such information about the occurrences into multiple tables.

Database systems often group tables based on categories of characteristics. Much of the information may be descriptive information about entities, categories, or classes of information (referred to generally as categories) involved in the occurrences. The description of these underlying categories may change infrequently compared to the other tables that record or measure the occurrences themselves. Dimension tables are tables that contain descriptive information about occurrences that are referenced by or may be referenced by other table(s). The other table(s) include column(s) that reference row(s) of the dimension table(s), and each referencing column identifies what is referred to as a dimension of column(s) that occur in dimension table(s). Data that is organized into two or more dimensions is referred to herein as multidimensional data.

Fact tables are the other tables that measure the occurrences related to the categories. In other words, fact tables store facts or measurable quantitative data, and this measurable data may be involved with or otherwise fall under the categories. By referencing the dimension tables, the fact tables do not need to duplicate all of the information contained in the dimension tables. Generally, because fact tables may include multiple occurrence(s) that reference the same category, fact tables are usually larger than dimension tables. Also, because fact tables measure the occurrences rather than recording the definitions, the fact tables are usually updated more frequently than dimension tables. An organization of multidimensional data into fact table(s) and dimension table(s) is referred to as a star schema.

In various examples, dimensions may have millions of rows, and the fact table could have billions of rows. However, the techniques described herein are not limited to any particular ranges for fact tables or dimension tables.

In one example, a product may be defined and described in one table, and that product as well as other products may appear in sales records of a sales table. Customers may also be described in one table and referenced in the sales table. The sales records in the sales table may correspond to occurrences of sales by a business, and, in particular, may identify which products and customers were involved in the respective sales. The sales records might not provide much if any other description of the products or customers that were involved in the respective sales. Instead, the sales records may refer to the customers and products tables using keys.

A foreign key is a key that is used by a fact table to refer to a candidate key of a dimension table, and the candidate key uniquely identifies records in the dimension table. The foreign key and the candidate key may be the same key or may be mapped to each other according to a mapping.

Tables 102, 104, and 106 of FIG. 1 illustrate an exemplary star schema with two dimensions. As shown, storage device(s) 100 store tables 102, 104 and 106. Table 102 is named "SALES" and contains information about sales that occurred for a business. Each row in sales table 102 contains a unique transaction id (TID) and information about how many units were sold (QTY). Table 104 is named "PROD" and contains information about each type of product that may be sold in any of the stores. Each row in products table 104 contains a unique product-id (PID) and information about the particular product. Table 106 is named "GEOG" and contains information locations about where products may be sold. Each row in geography table 106 contains a unique geography-id (GID) and information about the location.

Sales table 102 also includes the PID and GID columns, which map to corresponding columns in the product table 104 and geography table 106, respectively. For each row in sales table 102, the PID column indicates the type of product that was sold in a particular transaction, and the GID column indicates where the product was sold. The number of transactions may be vastly greater than both the number of locations and the number of products carried by the stores. Detailed information about the product and location involved in a sale transaction does not have to be stored in the rows of table 102 because such detailed information is available in tables 104 and 106, respectively. Instead, the rows of table 102 simply contain values (GIDs and PIDs) that reference information stored in the other tables 104 and 106. Therefore, tables 102, 104 and 106 constitute a star schema in which table 102 is the fact table and tables 104 and 106 are dimension tables.

The data stored in fact table 102 only has two dimensions, and therefore fact table 102 only has two columns dedicated to storing foreign key values for those dimensions. In general, a fact table must dedicate one column for storing foreign key values for each of the dimensions associated with the multidimensional data stored in the fact table. Thus, a fact table that stores data associated with twenty dimensions would dedicate twenty columns to the storage of foreign key values.

Data stored in relational database systems ("ROLAP" systems), for example, according to a star schema, is accessible to all applications that support interaction with such relational systems. Such database applications communicate with the relational database system by submitting commands that conform to the database language supported by the relational database system, the most common of which is the Structured Query Language (SQL).

Multidimensional data may alternatively be stored in specialized, multidimensional database systems ("MOLAP" systems). Multidimensional database systems provide structures and access techniques specifically designed for multidimensional data. When data is stored in specialized multidimensional database systems, only applications that are specially built to interact with those multidimensional database systems are able to access and manipulate the data.

An alternative approach to managing multidimensional data in a relational database involves storing the data in relational files but maintaining all multidimensional structure, metadata, administration, and access control using multidimensional database system techniques. Accessing relationally-stored data using multidimensional techniques poses numerous difficulties. For example, when all administration and access to the multidimensional data are controlled exclusively through the multidimensional database system engine, two database management systems must be administered. Further, database applications that access data using conventional relational commands (e.g. SQL commands) are unable to access the multidimensional data.

In one approach, multiple foreign key values of each row in the fact table are mapped to and replaced by a "replacement" value. The mapping allows the database server to derive a replacement value from any given combination of foreign key values. The database server may use an inverse mapping function to derive the keys from the fact table, where they are compressed, but inverse the mapping function does not provide any information beyond what was already stored in the fact table. This mapping function may help reduce the number of foreign key values represented in the fact table, but the mapping function is not helpful during query evaluation for queries that are constrained by several non-key values.

In another approach, the fact table may be modified to be sorted by or otherwise include information about additional characteristics that are useful for filtering purposes. However, maintaining this information in the fact table is cumbersome, and including such information in the fact table also increases the amount of resources required to load rows of the fact table during query evaluation.

Querying Multidimensional Data

Queries that operate on data stored in tables that belong to a star schema are referred to as star queries. Star queries often request information from a fact table with filters that are based on characteristics listed in the dimension tables. For example, a star query may request all sales records that involved customers between the ages of 25 and 30. Although the fact table may include all sales records and identify the customers involved in those sales, the fact table likely does not list the respective ages of those customers. Therefore, evaluation of the star query requires a determination of which fact table records identify customers that fall within the requested ages. Such a determination may consume significant amounts of resources for large fact tables and multiple filters.

In one example, the following SQL query, Query 1, may be evaluated to determine the dates of all sales of products that cost more than $1,000 from stores in San Jose.

| QUERY 1 |
| --- |
| select sales.date from sales, stores, products<br>where sales.store-id = stores.store-id<br>and sales.product-id = products.product-id<br>and stores.city = San Jose<br>and products.cost > $1,000 |

To speed up query evaluation, a query may be executed using indices, materialized views, or solved cubes that are built using data from the dimension tables and the fact table. For example, Query 1 may be executed by (1) using an index built on the city column of the stores table 102 to determine the set of all of the stores that are in San Jose ("SET1"), (2) using an index built on the cost column of the products table 104 to determine the set of all of the products that cost more than $1,000 ("SET2"), and (3) using an index built on the store-id, product-id columns of the sales table 106 to determine all rows that include both a store-id from SET1 and a product-id from SET 2.

Unfortunately, these method of executing star queries have significant drawbacks. Specifically, building indexes, materialized views, or solved cubes for each possible combination of fact table columns may be cost prohibitive, especially when there are many dimensions and the fact table contains numerous foreign key columns. If indexes or materialized views are not built for all combinations of columns, then an index or materialized view built on the exact columns of the fact table that are constrained by any given query may not exist.

Additionally, indexes or materialized views built on a superset of the columns constrained by a query are not always helpful. For example, an index built on key1, key2, key3 is useless for a query that does not specify a filter for key1. Use of indexes built on a subset of the columns constrained by a query may not be efficient either. For example, if an index exists for the "store-id" column of a sales table, but not for the store-id, product-id columns, then all of the rows in the sales table that contain store-ids from SET1 would have to be retrieved and inspected to determine if they also contain product-ids from SET2. Since each filter alone may not significantly constrain the query, conventional join techniques typically require scanning a large portion of the fact table when only a very small number of the rows in the fact table actually satisfy all of the filters of the query.

Another problem with the method of executing star queries described above is that the number of value combinations that satisfy the specified criteria may be vastly larger than the actual number of rows that satisfy the specified criteria. For example, there may be 50,000 products that cost more than $1,000 and there may be 50 stores in San Jose. However, products that cost more than $1,000 may have been sold only three times in San Jose. In the example, the store-id, product-id index would be accessed for 250,000 combinations of store-id, product-id in order to find the three rows that actually satisfy the criteria specified in the query. Further, the number of combinations that must be tested increases greatly as the number of dimension tables referenced by the query increases.

An alternative approach to executing star queries is described in Graefe, G. O'Neil, P. E. "Multiple-table Joins Through Bitmapped Join Indices", SIGMOD Record, Vol. 24, No. 3, September, 1995. According to this approach, a "join index" is used to access the fact table. A join index assumes a join on a particular set of columns between the fact table and one or more dimension tables. If the join is between the fact table and a dimension table on the normal join columns, it is possible to create a join index for other dimension table columns and the fact table.

A join index has index entries that may have the form <key, bitmap>, where "key" is a value from the dimension table column on which the index is built, and "bitmap" is a bitmap of the fact table indicating those rows in the fact table that would match the key according to the assumed join. Alternatively, the join index can have the format <rowid, bitmap>, where "rowid" identifies a particular row in a dimension table and "bitmap" represents the fact table rows that join with the particular row in the dimension table. Join indexes may also employ an actual list of rowids instead of bitmaps in the index entries.

Creating a join index is tantamount to precomputing a join. Join indexes may greatly increase the cost and/or complexity of doing updates and loading new data, as the join indexes would also need to be updated.

Another approach for processing star queries is to transform the star query to add subqueries that are based on join predicates and filters on dimension tables that are contained in the original query. The subqueries are executed, and the values returned by the subqueries are used to access one or more bitmap indexes built on columns of the fact table. The bitmaps retrieved for the values returned by each subquery are merged to create one subquery bitmap per subquery. An AND operation is performed on the subquery bitmaps, and the resulting bitmap is used to determine which data to retrieve from the fact table.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 illustrates example data arranged according to an example star schema.

FIG. 2 illustrates example dense data structures that may be created based on the example data of FIG. 1.

FIG. 3 provides an alternative view that shows row mappings for the example dense data structures in FIG. 2.

FIG. 4 illustrates two example data structures that were created to store aggregate data gathered from the fact table.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Methods, computer systems, and stored instructions are described herein for densely grouping dimensional data and/or aggregating data using a data structure, such as one that is constructed based on dimensional data. When smaller table(s) are joined with larger table(s), a server may analyze the smaller tables first to determine actual value combinations that occur in the smaller tables, and these actual value combinations are used to more efficiently analyze the larger tables. A dense data structure may be generated by processing dimensional data from dimension table(s) in whole or in part before processing data from fact table(s) in whole or in part, and this pre-processing of dimensional data may allow more efficient processing of data from the fact table(s). The dense data structure may be generated by compressing range(s) of values that are possible in dimension(s) into a range of values that actually occurs in the dimension(s), and/or the compressed range of values may be represented by dense set identifiers rather than the actual compressed range of values. The dense set identifiers, also known as dense grouping keys, uniquely identify sets of values from dimension(s) even though those values may repeat over multiple rows in the dimension(s).

Figure 5:
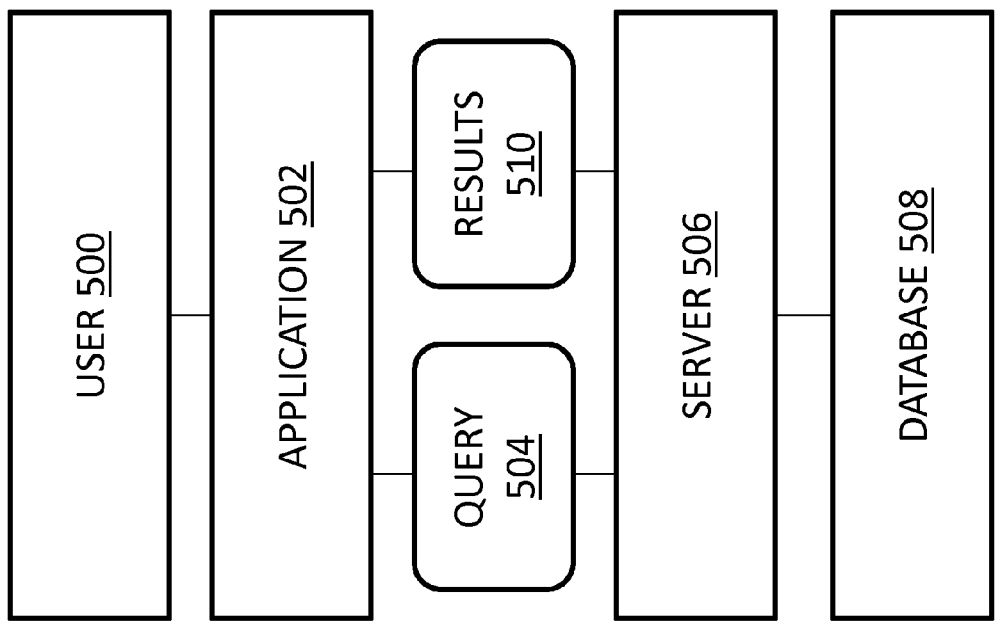
FIG. 5 illustrates an example server-client system for analyzing queries against a database.

FIG. 5 illustrates an example server-client system for analyzing queries against a database. As shown, a user 500 may interact with application 502 to generate a query 504 or queries that are to be executed against a database 508. Application 502 submits query 504 to server 506, and server 506 accesses database 508 to evaluate query 504. Server 506 may be a combination of hardware and software specially configured to evaluate queries and provide results. Server 506 may be one of many different server instances that are operating against the same database 508. After completing evaluation of the query, server 506 provides results 510 to application 502, and application 502 may display these results to user 500.

Figure 6:
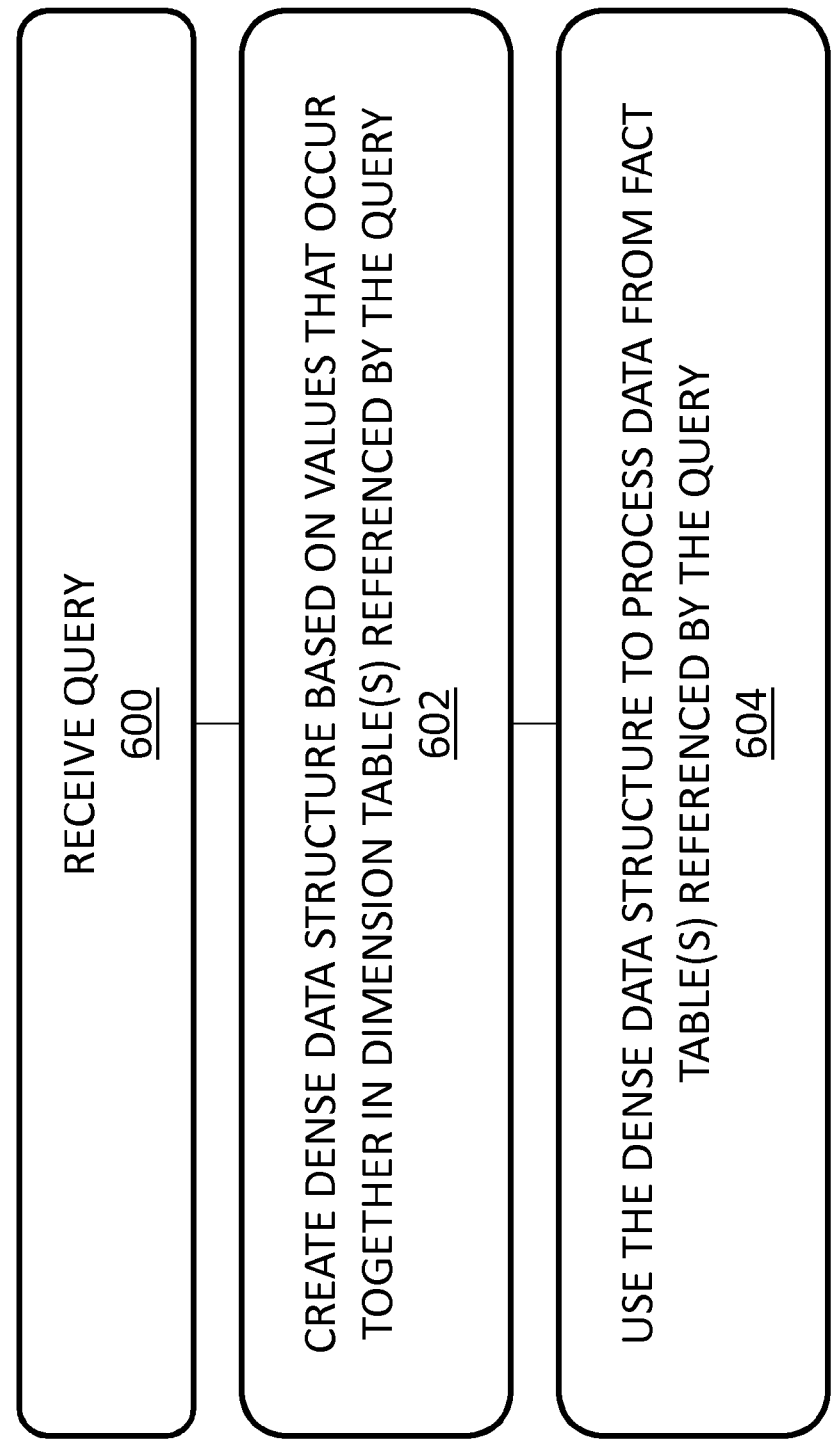
FIG. 6 illustrates an example process for creating and using dense data structures.

FIG. 6 illustrates an example process for creating and using dense data structures. In step 600, a server receives a query for execution against a database. The server temporarily stores the query or a transformation thereof for processing. In step 602, the server creates a dense data structure based on values that occur together in dimension table(s) that are referenced by the query. The server may then use the dense data structure in step 604 to process data from fact table(s) that are also referenced by the query.

Dense Set Identifiers and Dense Data Structures

The dense set identifiers may be contiguous values, such as a sequence of consecutive numbers, even if the actual compacted range of values is non-contiguous (i.e., has holes) or is non-numerical. Because the dense set identifiers do not need to include the actual values from the dimension table, the dense set identifiers may have a fixed size. Accordingly, a data structure created to store the dense set identifiers may be a fixed-width data structure such that different rows are accessible directly without performing a search operation. For example, the location of the rows of the data structure may be a function of the fixed size and the row number. Alternatively, the dense set identifiers may be located using hash values or the actual compressed range of values.

A single set of dense set identifiers may be generated for different columns in a dimension. The dense set identifiers may or may not identify any possible sets of values that do not actually occur in the dimension(s). Rather than assuming that the different columns in the dimension are completely independent from each other, a server determines which values actually co-occur in these columns to generate the dense data structure. The compacted range of values in the dense data structure may be significantly less than the Cartesian product of the ranges of values in the different columns in the dimension.

The dense data structure may be generated to identify which set identifiers match different rows of the dimension(s). For example, the dense data structure may specify, for each row of a dimension table, a set identifier value that describes a relevant combination of column values that occur in that row. In a particular example, the data structure is an array or a vector of the dense set identifiers. Different entries in the array or vector may include different dense set identifiers that correspond to different rows of the dimension table, and these dense set identifiers may be determined for the dimension table without analyzing other tables such as the fact table.

The data structure that is created differs from other data structures and objects that are created during query evaluation. In one example that illustrates this point, suppose that a first and a second table are joined together, and that data is aggregated according to the grouping in the second table. The first table may be a sales table, and the second table may be a products table. The sales may be grouped by product code.

Creation of the data structure may use monotonically increasing identifiers generated from the products table, for example, by determining all value combinations of color and size (columns of the products table) that are represented together in the products table. The identifiers represent actual combinations of values rather than possible combinations of values. In other words, the identifiers identify which colors appear with certain sizes. In an example, three set identifiers may identify three sets that actually occur in the data: (purple, 1), (purple, 2), and (purple, 3). The set identifiers may not include (purple, 4) if size 4 products do not come in purple (i.e., if this combination does not occur in the products table).

For example, if the products table(s) describe products having 10 possible colors and 20 possible sizes, and if not all 200 color-size combinations are represented together, a data structure may be created to map the color-size combinations that are actually represented together (for example, 50 combinations) to rows of the products table(s). In the example, the 150 combinations that are not represented together may be excluded from the data structure. In another example, a country, region, and city may be in a geography table, and these values may be highly dependent, although not necessarily fully dependent, on each other. For example, Redwood City may always occur with California and USA, and there may be no reason to represent, in the dense data structure, Redwood City with other regions such as Colorado or Connecticut, and no reason to represent, in the dense data structure, Redwood City with other countries such as Canada or Mexico.

In many example queries, there are a huge number of columns coming out of 4-5 tables. If identifiers for each of the columns were used, then the resulting range of identifiers would be a Cartesian product of the ranges of all of the separate sets of identifiers. In the examples, these Cartesian products of ranges may include thousands or even millions or billions of rows. Rather than combining identifiers for each of those columns, a single sequence of identifiers may be created to represent the values that actually occur together in all of the columns. The range of the single sequence may be considerably smaller than the Cartesian product of the columns.

The data structure is constructed using smaller tables, such as dimension tables, so that the server can reduce the amount of work required on a larger table, such as a fact table. The data structure is constructed by determining the actual combinations of values that occur together in the dimension tables rather than determining the combinations of values that would be possible based on individual ranges of different columns. For each dimension, the server can greatly reduce the number of values in the data structure to those values that are actually used. Across dimensions, if the actual combinations of values cannot be determined without analyzing the fact table, the server may create different data structures for different dimensions and combine these data structures using a Cartesian product of the set identifiers.

In one embodiment, the server consolidates values from multiple column(s) from a dimension table into a single sequence of set identifiers. Each of the multiple column(s) may have its own range of values, and the single sequence of set identifiers is not merely an independent combination (i.e., a Cartesian product) of these different ranges of values. Instead, the server determines which values in one column actually co-occur in the dimension table with values in another column. Sets of values that actually co-occur are identified by set identifiers. Sets of values that are possible in light of the different ranges of values but that do not actually co-occur between the columns in the dimension table are excluded from the set identifiers. In other words, the set identifiers do not identify possible set(s) of value(s) that do not co-occur in the column(s) of the dimension table. By excluding values that do not actually co-occur in the columns, the range of values covered by the set identifiers may be significantly smaller than the Cartesian product of the different ranges of values for the different columns.

In one embodiment, the server consolidates values from column(s) in different dimensions or from different dimension tables into different sequences of set identifiers stored in different database structures. The server may use different columns of keys from the fact table to reference the different database structures. In this embodiment, each sequence of set identifiers may densely represent data from a single dimension, and the sequences of set identifiers, considered together, may represent data from the different dimensions. The dimensions may not be completely independent from each other, but there might not be any table other than the fact table that associates the dimensions with each other. In this scenario, the different sequences of set identifiers may include a number of identifiers that corresponds to the Cartesian product of the number of actual sets of values in one dimension with the number of actual sets of values in another dimension. In other words, the different sequences, when considered together, may cover values from one dimension that do not actually co-occur with values from the other dimension. However, within each dimension, the respective sequence of values might not have any holes for values that do not actually co-occur in that dimension.

The fact table may have a column of keys that map into the data structure. For example, the keys may identify rows of the data structure and the corresponding rows of a dimension table. In another example, the server accesses a stored mapping that maps the keys from the fact table to other keys that represent the rows of the dimension table. The keys from the fact table could correspond with the keys from the dimension table according to a one-to-one mapping, but the keys may not be identical.

The dense keys may cover a range that is significantly less than a mere hash of the original values in the dimension columns that were combined. If the values of the dimension columns are hashed, the resulting range of the hash values would likely be more than the Cartesian product of the ranges of the dimension columns. Hash functions are designed to avoid collisions, and, thus, generation of hash values generally results in padded, unused space between resulting values. Further, because hash functions deal with original values, which may be strings or other large or sparsely populated sets of data, the hash values often require even more computer resources to store and process. Also, if a dimension were processed using a hash function, the use of the hash function to convert original values would be accompanied by the use of a reverse hash function to determine the original values from the hashed values. Such processing involves computations on large ranges and does not allow key values from the fact table to be mapped directly (i.e., without using an intermediate hash operation) to rows of the dimension table.

Building the data structure may take longer than merely hashing values from dimension columns. Creation of the data structure may include initially hashing values from the dimension columns to a set of hash values, and then assigning sequential identifiers to used hash values. The server may spend increased resources to create the data structure based on the dimension table(s) in order to save resources when processing the fact table(s). The data structure may be used to save time and resources that may have otherwise been used working with large ranges or hash functions while performing scanning or aggregating operations with respect to the fact table. In various examples, the dense set identifiers may be 1 byte, 2 bytes, 3 bytes, or 4 or more bytes in size compared to an example 200 byte multi-column key. At query evaluation time, after the application or user has submitted a query and is waiting for query execution, the server takes an initial step of creating the data structure with a goal of saving time on later steps of processing the fact table.

FIG. 2 illustrates example dense data structures that may be created based on the example data of FIG. 1. As shown, the dense data structures 208 and 210 identify dense set identifiers for different combinations of values in columns. In the example of FIG. 2, dense structure 208 includes set identifiers for different value combinations in the manufacturer (MFG) and category (CAT) columns of products table 204. As shown, the combination {GE, APPLIANCE} has been assigned to an identifier of 1, and the combination {GE, ELECTRIC} has been assigned to an identifier of 2. Dense structure 210 includes set identifiers for different value combinations in the country and state columns in geography table 206. As shown, the combination {USA, WA} has been assigned an identifier of 1, and the combination {USA, CA} has been assigned an identifier of 2.

FIG. 3 provides an alternative view that shows row mappings for the example dense data structures in FIG. 2. The row mappings may be implied without being separately stored in the data structure or the product table, but the row mappings are provided to better explain the example. As shown, the row from products table 304 with PID=3 is represented by the third row (RIDP=3) of data structure 308. The first two rows are of data structure 308 are not shown. Also as shown, the row from products table 304 with PID=4 is represented by the fourth row (RIDP=4) of data structure 308. The third and fourth rows of data structure 308 are associated with the products data set identifier of 1 (DSIP=1), which corresponds to {GE, APPLIANCE}. The row from products table 304 with PID=6 is represented by the sixth row (RIDP=6) of data structure 308. Unlike the third and fourth rows, the sixth and eighth rows of data structure 308 are associated with the products data set identifier of 2 (DSIP=2), which corresponds to {GE,ELECTRIC}.

The dense data structures 208 and 210 may be generated in response to receiving a query, such as:

---
QUERY 2:
---
SELECT p.cat, g.country, g.state, sum(s.qty)
FROM sales s, prod p, geog g
WHERE s.gid = g.gid AND s.pid=p.pid
    AND g.state in ('WA', 'CA') AND p.mfg = 'GE' AND p.cat in
('APPLIANCE', 'ELECTRIC')
GROUP BY p.cat, g.country, g.state

---

In the example, the server may identify the grouped columns of p.cat, g.country, and g.state as columns that are relevant for computing the aggregation operation. The server may also determine that the column p.mfg is relevant for computing the aggregation operation because values except 'GE' have been filtered from that column. The server may then determine the dense set identifiers for the relevant columns of the geography table, g.country and g.state, and create data structure 310 by executing the following query:

---
QUERY 3:
---
CREATE TEMPORARY TABLE tt_geog as
SELECT max(g.country), max(g.state), xlate_create(...) dsig
FROM geog g
WHERE g.state in ('WA', 'CA')
GROUP BY g.country, g.state

---

The example query creates a temporary table of values that includes a DSIG column. The GROUP BY clause in the query causes the duplicate combinations of country and state to appear adjacently in the table, and the same DSIG is assigned for all same combinations of country and state. The DSIG column in the temporary table may have monotonically increasing integer values, for example, starting at 1.

The xlate_create( ) function stores an array, vector, or simple data structure such that different rows or entries of the data structure correspond to the different rows or entries of the geography table 306. As shown, because DSIG=1 corresponds to GID=2, DSIG=1 may be stored in the second row (RIDG=2) of data structure 310. Data structure 310 may be zero-filled or null-filled for rows of the data structure that do not map to interesting rows of geography table 306. In other words, rows that are not relevant to the query may be zero-filled or null-filled.

Similarly, the server may determine the dense set identifiers for the relevant columns of the products table, p.cat and p.mfg, and create data structure 308 by executing the following query:

---
QUERY 4:
---
CREATE TEMPORARY TABLE tt_prod as
SELECT max(p.cat), xlate_create(...) dsip
FROM prod p
WHERE p.mfg = 'GE' AND
GROUP BY p.cat

---

The example query creates a temporary table of values that includes a DSIP column. The GROUP BY clause in the query causes the duplicate categories to appear adjacently in the table, and the same DSIP is assigned for all products in the same category. The DSIP column in the temporary table may have monotonically increasing integer values, for example, starting at 1. Query 4 also filters out all rows that do not satisfy the condition p.mfg='GE,' and this filter also appeared in the example received query, Query 2. Other such filters may also be applied based on the received query when the data structures are being created and before the fact table is analyzed.

The xlate_create( ) function stores an array, vector, or simple data structure such that different rows or entries of the data structure correspond to the different rows or entries of the products table 304. As shown, because DSIP=1 corresponds to PID=3, DSIP=1 may be stored in the third row (RIDP=3) of data structure 308. Data structure 308 may be zero-filled or null-filled for rows of the data structure that do not map to interesting rows of products table 304. In other words, rows that are not relevant to the query may be zero-filled or null-filled.

Evaluating Queries Using Dense Data Structures

In one embodiment, one or more computing devices, such as a server, receive a query that references database objects. For example, the query may reference dimension table(s) and fact table(s), but the query might not identify which of the tables are dimension tables and which of the tables are fact tables. The structure of the query, the sizes of the tables, and/or other information maintained about the tables may be used to determine which of the tables are likely to be dimension tables and which of the tables are likely to be fact tables.

Based at least in part on the query, for a set of column(s) of the dimension table(s), the server creates a data structure that maps set identifiers to rows of the dimension table(s). Each of the set identifiers identifies a different set of value(s) that occurs in the set of column(s). The set identifiers may be contiguous values that do not leave holes or gaps across the range of different sets of values that occur in the set of column(s). At least one of the different sets of value(s) may repeat at least once in the set of column(s).

In one embodiment, the query is transformed to a semantically equivalent query or execution plan. The transformed query or execution plan, when executed, uses the data structure. As used herein, a query is "transformed" when the query is (a) rewritten from a first form to a second form, (b) received in a manner that specifies a first set of operations, such as a first form or a first execution plan, and executed using a second set of operations, such as the operations specified by a second form or second execution plan, or (c) received in a manner that specifies a first set of operations, and planned for execution using a second set of operations. An execution plan is a set of directives, such as a query tree structure, that is prepared for an execution engine. Two queries or execution plans are semantically equivalent to each other when the two queries or execution plans, if executed, would produce equivalent result sets, even if the result sets are assembled in different manners by the two queries or execution plans. Execution of a query is semantically equivalent to a query or execution plan if the query execution produces a result set that is equivalent to the one that would be produced by the query or execution plan, if executed.

By dynamically creating the data structure during query evaluation, after receipt of the query and before the query has completed execution, the server can create the data structure to ensure that there are no holes in the range of dense set identifiers, and the data structure may consume a minimal amount of resources during evaluation of the query with respect to the fact table.

The server evaluates the query with respect to the fact table at least in part by using the data structure to associate keys in the fact table with set identifiers of the set identifiers. For example, a foreign key column of the fact table may map to different rows of the data structure, and the different rows of the data structure may indicate which set identifier corresponds to a corresponding row of a corresponding dimension table.

In one example, a product id column in the fact table is used as a reference into the data structure, and the data structure may describe different sets of value combinations that exist in the products table. The products table, in turn, may have different products that are identified by the product id. In this example, the product id column may exist in both the fact table and the products table, but the product id column may be unique with respect to the rows of the products table and also with respect to the rows of the data structure. In this example, a product id of 50 in a row of the fact table may be used as a reference to the fiftieth row of the data structure, which, for example, may hold the dense set identifier associated with the corresponding row of the corresponding dimension table(s).

In another example, the keys that are used to reference the data structure may be derivable from the key column in the fact table. For example, the keys for referencing the data structure may be a function of the values in the key column (for example, key column*1000). In another example, the values of the key column may be mapped to the keys for referencing the data structure by using a separately maintained mapping.

Different data structures for different dimensions may be created in a similar manner in response to receiving the query. Both structures may be created in whole or in part before evaluating the query with respect to the fact table. The different data structures may be defined by overlapping sequences of consecutive integer values or by some other identifying values. The fact table may include keys that directly reference the rows of the data structures and their respective dimension tables, or the keys may be mapped to other keys for the rows of the data structures and their respective dimension tables.

The server may complete the creation of the data structure using dimension table(s) before starting evaluation of the query with respect to the fact table(s). Alternatively, the server may begin creating the data structure concurrently as the query is being processed with respect to the fact table(s). The server may operate different processing threads in parallel, and one subset of the threads may cause generation of the data structure while another subset of the threads processes the fact table(s). Whether or not the server creates the data structure and processes the fact table in parallel, after the data structure has been generated, the server may transition to processing the fact table(s) using the data structure.

The same data structure may be re-used for processing subsequent queries, upon determining that the subsequent queries, if executed, would use at least part of the data structure. The data structure may be initially generated based on column combinations that are often referenced in queries even before any such queries have been received. Such expected column combinations may be selected by the server based on those columns that are frequently referenced together, those columns with a high degree of data dependency (i.e., columns that may realize the greatest benefit to combining), or those columns that are specified by a user or application.

Query results may be filtered based at least in part on query filter(s) that may appear in a predicate of the query. For example, the query may include a WHERE clause that places these filter(s) on the data to be selected. The filter(s) may identify values from the dimension table that are to be associated with the query results and/or values from the dimension table that are not to be associated with the query results. For example, a filter of "WHERE CUSTOMERS.AGE=25" specifies a value of the AGE column in the CUSTOMERS table that would be satisfied by any sales records that are returned by the query; sales records that are not associated with an CUSTOMERS AGE column of 25 would be filtered from the query results.

Because these rows are filtered from the query results, corresponding rows do not need to exist among the set identifiers. Accordingly, set identifiers that are associated with column values that cannot satisfy the query, such as AGE values that are not 25 in the example, may be filtered from the set identifiers. After filtering out a subset of the set identifiers, there may be few set identifiers left that could satisfy the query filters. Rather than fully analyzing every row in the fact table, the server may analyze only those rows of the fact table that could be associated with the remaining set identifiers. For example, if value sets 5 and 7 are the only value sets remaining after applying the filter, and if those sets only apply to ten rows of the dimension table, then, rather than analyzing all rows individually, the server may look for ten keys in the fact table that correspond to those ten rows of the dimension table. If the fact table is sorted or arranged in a manner that at least partially depends on the key, these ten rows may be easily located without even looking at the keys in other rows of the fact table.

In one embodiment, data structures can be used to filter rows from the fact table even if they are not used to supply dense structures for aggregation purposes and/or even if they are not determined using dense set identifiers from dimension tables. The data structures may represent different values or combinations of values that could be satisfied by the query, and these data structures may be mapped to the fact table to remove rows of the fact table from consideration during query evaluation.

Even if the server analyzes each row of the fact table, such analysis is likely to be more efficient if the server does not have to retrieve values from the dimension table using keys from the fact table, and analyze those values against the query. The keys from the fact table may be mapped directly or indirectly to rows of the data structure that holds the dense set identifiers. If a fact table row maps to a dense set identifier that is associated with values that satisfy the query, then the fact table row may be retained as part of the result set or used to compute the result set. Whether or not the dense set identifier is associated with values that could satisfy the query may be determined separately from, and optionally before, analysis of the fact table.

The server may process each dimension into interesting sets of value combinations before evaluating the query with respect to the fact table. A data structure that maps the interesting sets of value combinations to rows of the corresponding dimension table(s) may be used throughout query execution, including during possible aggregation operations. In contrast, traditional approaches may perform a join operation on the dimension table(s) and the fact table, and extra information contained in the fact table may be stored and analyzed throughout the query evaluation process even though this extra information may not affect the query execution.

Returning to the example of FIGS. 2-3, the dense data structures 208 and 210 may be generated in response to receiving example Query 2, repeated here:

SELECT p.cat, g.country, g.state, sum(s.qty)
FROM sales s, prod p, geog g
WHERE s.gid = g.gid AND s.pid=p.pid
    AND g.state in ('WA', 'CA') AND p.mfg = 'GE' AND p.cat in ('APPLIANCE', 'ELECTRIC')
GROUP BY p.cat, g.country, g.state Based on the structure of the query, the server may determine to treat sales table s as a candidate fact table because aggregation or some other complex fact-based analysis is performed on that table. Alternatively or additionally, the server may determine which table is a fact table based on whether or how many equijoins (such as WHERE "s.gid=g.gid" and "s.pid=p.pid") the table is referenced in. In another example, the server receives a query that identifies s as a fact table by marking s according to a specialized syntax or by naming s according to a specialized naming convention. In other examples, the server may determine that s is a candidate fact table based on stored metadata about s, based on user-specified metadata that is received with the query, or even arbitrarily.

Assuming that s is the fact table, there are two possible foreign keys that are used in the query, s.gid and s.pid, as indicated by the two equijoins involving s. Both of these keys are possible foreign keys because they are equijoined with keys from the geography and products table, respectively. Note that p.pid is a unique key for p and g.gid is a unique key for g. Accordingly, the server may determine, based on the query, that s is a candidate fact table and p and g are separate candidate dimensions.

If the server identifies multiple candidate fact tables and multiple candidate dimension tables, the server may choose to treat one or more of the candidate fact tables as fact tables and one or more of the candidate dimension tables as dimension tables such that none of the selected fact tables are being treated as dimension tables and vice versa. Such a decision may be based, at least in part, on sizes of the respective tables and/or expected costs of executing the query for different selections of fact table(s) and dimension table(s). For example, the server may consider smaller tables as more likely to be dimension tables and larger tables as more likely to be fact tables. Alternatively or additionally, the server may choose the selection of fact table(s) and dimension table(s) that has a minimal expected execution cost.

In the example, data structure 308 is created based on p, and data structure 310 is created based on g. The different DSIPs in data structure 308 represent different combinations of mfg and cat in p, and the different DSIGs in data structure 310 represent different combinations of country and state in g. In the example, each dimension table 304 and 306 has only two possible combinations of values ({GE, APPLIANCE} or {GE, ELECTRIC} for p and {USA, WA} or {USA, CA} for g).

Once the server has generated data structures 308 and 310 based on dimension tables 304 and 306, the server may use the data structures to perform aggregation or some other complex fact-based analysis on the fact table 302. When processing a given row in the fact table, the server may quickly determine the dense set identifier for the row by using the respective key as a reference into the respective data structure. For example, when processing the fifth row of the fact table (TID=5), the server may use GID=7 as a reference to the seventh row of data structure 310 and PID=6 as a reference to the sixth row of data structure 308. Accordingly, the server may quickly determine that the fifth row corresponds to the geography dense set identifier of 2 and the products dense set identifier of 2. These dense set identifiers may be used to determine whether the row satisfies query conditions and/or as a reference into another data structure, such as one that is used for aggregation. For example, the address of (2,2), corresponding to the dense set identifiers for the fifth row of the fact table, may be used to store information that is being aggregated for at least that row of the fact table.

Using Data Structures for Aggregation

Although techniques are described herein for generating data structures from dimension tables, helpful data structures may be generated from any database object, even from the fact table. For example, a data structure may be generated by operating over grouping columns in the fact table, and the data structure may be used to further process the fact table, for example, for aggregation purposes. In another example, dense keys generated from dimension tables may be used to establish storage containers for different columns of the dimension tables for which an aggregation operation is grouped. In yet another example, unique values in the column of a table may be assigned to a numeric key, and that key may be used as an in-memory table key even if such a key is not established by processing dimension tables to generate unique set identifiers.

In one embodiment, a server receives a query that aggregates data from at least one database object. For a set of column(s) on which the aggregated data is grouped, before evaluating the query to aggregate the data, the server causes different storage containers to be created for each different set of values that occur in the set of column(s) on which the aggregated data is grouped. The server then evaluates the query to aggregate the data from the at least one database object at least in part by using keys from the at least one database object to locate corresponding storage containers of the different storage containers.

In one embodiment, a dense data structure may be generated to contain different data containers that correspond to the different set identifiers. The different set identifiers may be value combinations that occur in the dimension columns or may be determined as compressed or translated values that are based on the value combinations that occur in the dimension columns. The different data containers may be used to hold data that is aggregated from a fact table. As data is aggregated using the different data containers, either the data placed into an empty container that corresponds to a set identifier that describes the row of the fact table from which the data originated, or the data is aggregated with data in a non-empty container that corresponds to the set identifier that describes the row of the fact table from which the data originated.

For example, the server may receive a query that aggregates data from fact table(s) and references dimension table(s). For a set of column(s) of the dimension table(s), the server may create a data structure comprising different storage containers for each different set of value(s) that occur in the set of column(s). The different storage containers are mapped to different rows of the dimension table(s). The server may then evaluate the query to aggregate data from the fact table(s) at least in part by using keys in the fact table(s) to locate corresponding storage containers of the different storage containers.

Example aggregation operations include, but are not limited to, sum, maximum, minimum, count, distinct, average, and standard deviation. In each of these examples, a storage container holds a rolling aggregate value that is initialized to zero or null and is aggregated iteratively as new data is placed into the storage container. In a first example, the aggregation operation is a SUM, and the container holds a rolling sum that stores a sum of all values from processed rows of the fact table that matched a corresponding set identifier. For example, three values, 8, 5, and 12, occur in the column of the fact table that is being aggregated. These three values may occur in rows that are all associated with a corresponding set identifier, such as set number 30. Set number 30 may, for example, identify a set of dimension values of AGE=40 and STATUS=MARRIED. In the first example, a container may initially hold a value of NULL or 0, and may be updated to 8 after reaching the first value of 8, 13 (8+5) after reaching the second value of 5, and finally 25 (13+12) after reaching the third value of 12.

In a second example, the aggregation operation is either MIN or MAX, and the container holds a rolling minimum or maximum that stores a minimum or maximum of all values from processed rows of the fact table that matched a corresponding set identifier. If the example values are still 8, 5, and 12, and the aggregation operation is MIN, the storage container may initially hold a value of NULL or 0. After the first value of 8 is reached, the storage container holds a MIN value of 8 (MIN(8)). After the second value of 5 is reached, the storage container holds a MIN value of 5 (MIN(8,5)). After the third value of 12 is reached, the storage container still holds the MIN value of 5 (MIN(12,5)). If the aggregation operation is instead a MAX operation, the container holds 8 (MAX(8)) after the first value, 8 (MAX(8, 5)) after the second value, and 12 (MAX(8, 12)) after the third value.

Other aggregation operations, such as averages, distincts, and standard deviations may be performed using a multi-step approach. For example, an average could be computed using the storage containers to hold a tuple comprising a rolling sum and a rolling number of rows that contributed to the rolling sum. Once the server is finished filling the storage containers, the average may be computed by dividing the rolling sum by the rolling number of rows. In another example, distincts may be computed by appending, to a list of items in a storage container, only those items that do not already appear in the list of items for that storage container.

In another embodiment, rather than aggregated-as-you-go or rolling aggregation, the data is aggregated in the different storage containers after the individual data values have been stored in the different storage containers. In this embodiment, as data is aggregated using the different data containers, either the data placed into an empty container that corresponds to a set identifier that describes the row of the fact table from which the data originated, or the data is appended to data in a non-empty container that corresponds to the set identifier that describes the row of the fact table from which the data originated. After the server has accounted for all of the relevant data, the sequences of appended data in the containers may be aggregated on a container-by-container basis.

Multiple queries may be received and executed using the same data structure. A data structure containing aggregated data or other processed data may be generated during the execution of one of the queries, and the data structure may be re-used for another of the queries. For example, the server may determine that the other query is a query that, if executed, could use at least part of data that has been aggregated in the different storage containers of the data structure, and the server could re-use at least part of the aggregated data in the different storage containers to evaluate the other query.

In one example, a product id column of a fact table is used to reference the data structure, which may be a simple array where sales are accumulated. In a particular example, the data structure may reference different set identifiers, where each set is described as a unique combination of {sales margin category, sales price}. The data structure may have separate containers for high margin items of $10, $20, and $50 and low margin items of $10, $50, and $200. In the example, there might not be any $20 products that are low margin items or any $200 products that are high margin items. The separate containers may be filled by aggregate values based on the sales that occurred and were recorded in the fact table. For example, the aggregate values may be a count of the number of sales records that included at least one sale in any of the categories.

Creation and use of the data structure avoids holes and large ranges that would be associated with a two-level hash between the products table and the sales table. In the hash example, a hash table could be created as a function of the product id. When processing the fact table, the product id column of the fact table is hashed to determine a location from among several sparsely populated locations in the hash table. Not only is the data structure densely populated, but use of the data structure might not even require execution of a hashing function. In the example, the product id column of the fact table may directly reference different rows or entries of the data structure, and these different rows or entries may be associated with different sets of values that occur in the dimension table(s).

Example Query 2, which requests aggregation over the quantity column of the fact table (SUM(S.QTY)), is reproduced here:

---
SELECT p.cat, g.country, g.state, sum(s.qty)
FROM sales s, prod p, geog g
WHERE s.gid = g.gid AND s.pid=p.pid
    AND g.state in ('WA', 'CA') AND p.mfg = 'GE' AND p.cat in ('APPLIANCE', 'ELECTRIC')
GROUP BY p.cat, g.country, g.state
---

FIG. 4 illustrates two example data structures that were created to store aggregate data gathered from the fact table according to example Query 2. Data structure 412A shows one example 2×2 aggregation array for holding aggregate values from fact table 402, and data structure 412B shows an example intermediate 2×2 aggregation array for holding aggregate values from fact table 402.

Data structure 412A may hold a rolling sum that is updated as values are processed from the fact table or a delayed sum that is computed after the values have been processed from the fact table. Data structure 412B depicts an example of data storage for a delayed sum. For example, Data structure 412A may be initialized such that each of the cells is zero or null. When analyzing the first row of the fact table, the server may map GID=2 to the second row of data structure 310 and PID=8 to the eighth row of data structure 308 to determine that the first row of the fact table falls under the storage container identified as {DSIG=1, DSIP=2}. Accordingly, under the rolling sum approach, the value of 50 (the quantity for row 1 of the fact table) is stored in (1,2) of data structure 412A. Under the delayed sum approach, the value of 50 is stored in (1,2) of data structure 412B.

The server may continue to process rows, reaching row 7, which also maps to the storage container identified as {DSIG=1, DSIP=2}. Under the rolling sum approach, the server updates the value stored in (1,2) of data structure 412A by adding 40, which is the quantity for row 7 of the fact table. After processing row 7, data structure 412A may store a value of 90 (50+40) in (1,2). Under the delayed sum approach, the server appends 40 to the value stored in (1,2) of data structure 412B. After processing row 7, data structure 412B may store a sequence of {50, 40}.

Continuing with the example, the server may reach row 10 of the fact table, which also maps to the storage container identified as {DSIG=1, DSIP=2}. Under the rolling sum approach, the server updates the value stored in (1,2) of data structure 412A by adding 20, which is the quantity for row 10 of the fact table. After processing row 10, data structure 412A may store a value of 110, as shown in FIG. 4. Under the delayed sum approach, the server appends 20 to the values stored in (1,2) of data structure 412B. After processing row 10, data structure 412B may store a sequence of {50, 40, 20}, as shown in FIG. 4.

The rolling aggregate approach produces a data structure that always contains the latest computed aggregate values; whereas the delayed aggregate approach involves a final aggregation step to compute the aggregate values. In the example of FIG. 4, the final sum may be computed for (1,2) of data structure 412B by summing the values of 50, 40, and 20 in the stored sequence.

After storing the aggregates into an aggregation data structure 412A, the server may generate a result set by mapping the cells from the aggregation data structure back to the value combinations that they represent. For example, the cell (1, 2) may be mapped, using data structures 410 and 408, back to row 2 of the geography table (from row 2 of data structure 410) and row 6 of the products table (from row 6 of data structure 408). These rows represent the overall value combination of {COUNTRY=USA, STATE=WA, MFG=GE, CAT=ELECTRIC}. Other cells of the aggregation data structure may also be similarly mapped back to the original value combinations that they represent.

Extensions and Alternatives

Various examples herein refer to dimension table(s), dimension(s), and fact table(s), but the examples may also apply to tables, columns, or other database objects that are not characterized as such. For example, the examples herein may be applicable in scenarios where one table is smaller than another table, regardless of whether the smaller table is a dimension table and regardless of whether the larger table is a fact table. In another example, the server may guess whether a table is a fact table or a dimension table based on a size of the table and position(s) of reference(s) to the table in a query, but the server may or may not verify the accuracy of this guess.

Various examples herein refer to receiving, processing or analyzing a query. As used herein, a query may refer to individual query blocks, which are separately consumable chunks of query language. Query blocks are processed to provide separate sets of results, but result sets from multiple query blocks could be combined to form another set of results. In other words, separate queries, as referred to herein, may actually be separately consumable sub-queries of a higher-level query.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
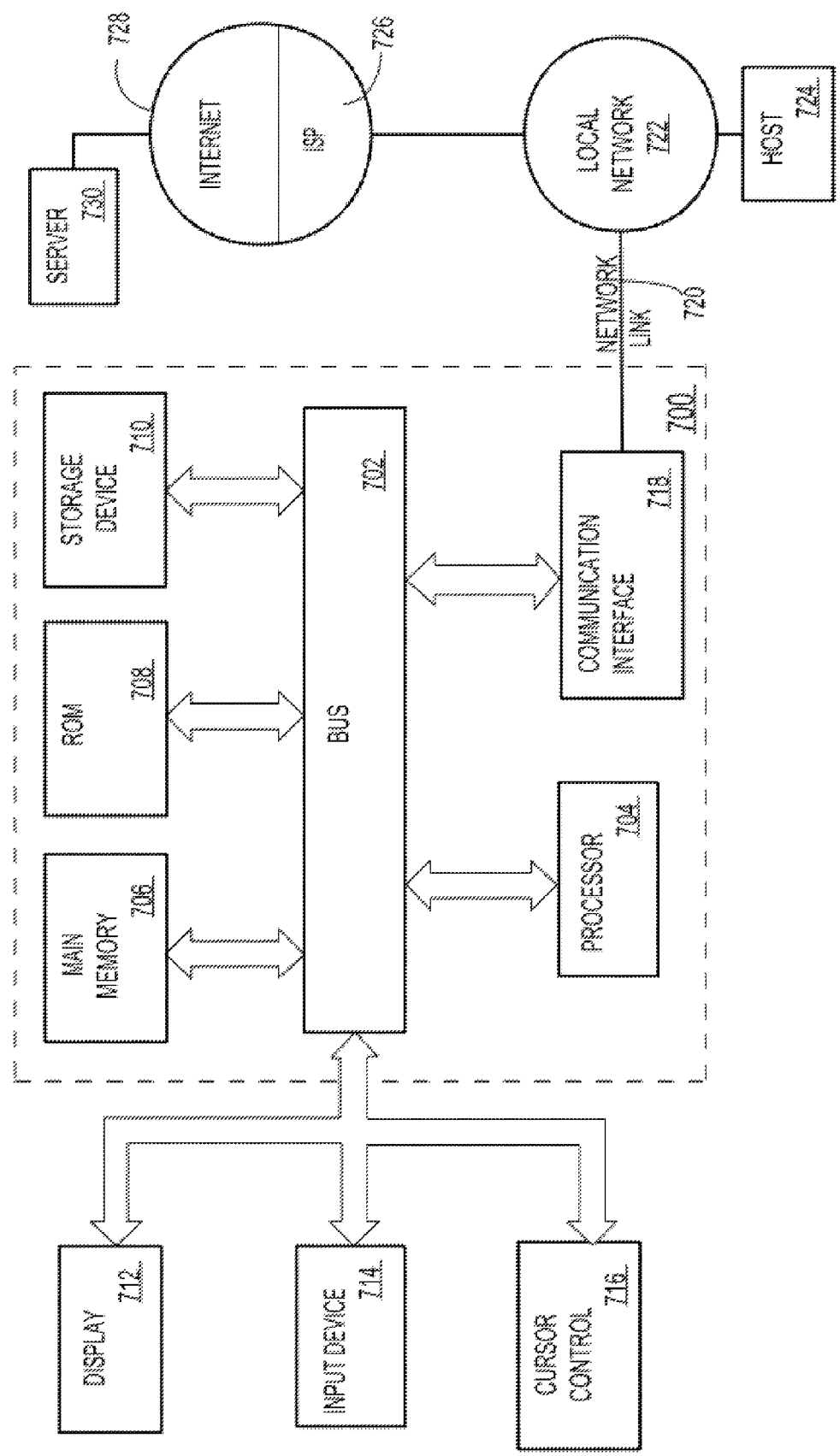
FIG. 7 illustrates an example computer system that may be specially configured according to the various embodiments described herein.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   in response to receiving a query that aggregates data from at least one database object, of a plurality of database objects:
      creating one or more storage containers, each corresponding to one or more set identifiers of a plurality of set identifiers;
      wherein mapping data maps each set identifier, of the plurality of set identifiers, to one or more key values that respectively identify one or more rows storing a particular unique combination of values, each value of said particular unique combination of values occurring in a different column on which data is grouped in the query;
   evaluating the query;
   wherein evaluating the query comprises aggregating the data from the at least one database object;
   wherein aggregating the data comprises:
      analyzing a particular row of the at least one database object, wherein the particular row includes a particular key value that is mapped, in the mapping data, to a particular set identifier,
      locating at least one storage container, of the one or more storage containers, that corresponds to the particular set identifier, and
      aggregating data, from the particular row of the at least one database object, within the at least one storage container;
   wherein the method is performed by one or more computing devices.

2. The method of claim 1, wherein:
   the query, when evaluated, aggregates the data by computing a sum of data from the at least one database object; and
   the method further comprises:
      prior to analyzing the particular row, storing one or more rolling sums in the at least one storage container;
      wherein aggregating the data, from the particular row of the at least one database object, within the at least one storage container comprises adding a value, from the particular row, to the one or more rolling sums.

3. The method of claim 1, wherein;
   the query, when evaluated, aggregates the data by computing a maximum of data from the at least one database object; and
   the method further comprises:
      prior to analyzing the particular row, storing one or more rolling maximums in the at least one storage container;
      wherein aggregating the data, from the particular row of the at least one database object, within the at least one storage container comprises updating the one or more rolling maximums based, at least in part, on a value from the particular row.

4. The method of claim 1, wherein:
   the query, when evaluated, aggregates the data by computing a minimum of data from the at least one database object; and
   the method further comprises:
      prior to analyzing the particular row, storing one or more rolling minimums in the at least one storage container;
      wherein aggregating the data, from the particular row of the at least one database object, within the at least one storage container comprises updating the one or more rolling minimums based, at least in part, on a value from the particular row.

5. The method of claim 1, wherein:
   the at least one storage container contains one or more sequences of values, from the at least one database object, to be aggregated; and
   aggregating the data, from the particular row of the at least one database object, within the at least one storage container comprises including a value, from the particular row, in the one or more sequences of values.

6. The method of claim 1, wherein the query is a first query; the method further comprising:
   retaining aggregated data in the one or more storage containers after evaluation of the first query;
   determining that a second query involves at least part of the aggregated data in the one or more storage containers; and
   in response to determining that the second query involves at least part of the aggregated data, using at least part of the aggregated data, from the one or more storage containers, to evaluate the second query.

7. The method of claim 1 further comprises:
   creating a data structure that stores the mapping data.

8. The method of claim 1, further comprising using a stored mapping to map key values from the at least one database object to key values of at least one other database object of the plurality of database objects, wherein the at least one storage container is located using the key values of the at least one other database object.

9. The method of claim 1, wherein the one or more storage containers are mapped to a Cartesian product of set identifiers for two or more dimensions that are referenced by the query, and wherein the at least one database object comprises a fact table.

10. The method of claim 7 wherein:
the data structure comprises an array of the plurality of set identifiers, and wherein each entry in the array corresponds to a corresponding key of at least one other database object that is referenced by the query.

11. The method of claim 7, further comprising:
filtering, from the data structure, set identifiers that represent particular combinations of values that cannot satisfy the query to produce a set of remaining set identifiers; and
wherein aggregating the data further comprises analyzing only those rows of the at least one database object that are associated with set identifiers included in the set of remaining set identifiers;
wherein the particular row of the at least one database object is associated with a set identifier included in the set of remaining set identifiers.

12. One or more non-transitory computer-readable storage media storing instructions, which, when executed by one or more processors, cause:
in response to receiving a query that aggregates data from at least one database object, of a plurality of database objects:
creating one or more storage containers, each corresponding to one or more set identifiers of a plurality of set identifiers;
wherein mapping data maps each set identifier, of the plurality of set identifiers, to one or more key values that respectively identify one or more rows storing a particular unique combination of values, each value of said particular unique combination of values occurring in a different column on which data is grouped in the query;
evaluating the query;
wherein evaluating the query comprises aggregating the data from the at least one database object;
wherein aggregating the data comprises:
analyzing a particular row of the at least one database object, wherein the particular row includes a particular key value that is mapped, in the mapping data, to a particular set identifier,
locating at least one storage container, of the one or more storage containers, that corresponds to the particular set identifier, and
aggregating data, from the particular row of the at least one database object, within the at least one storage container.

13. The one or more non-transitory computer-readable storage media of claim 12, wherein:
the query, when evaluated, aggregates the data by computing a sum of data from the at least one database object; and
the instructions further comprise instructions which, when executed by one or more processors, cause: prior to analyzing the particular row, storing one or more rolling sums in the at least one storage container;
wherein aggregating the data, from the particular row of the at least one database object, within the at least one storage container comprises adding a value, from the particular row, to the one or more rolling sums.

14. The one or more non-transitory computer-readable storage media of claim 12, wherein;
the query, when evaluated, aggregates the data by computing a maximum of data from the at least one database object; and
the instructions further comprise instructions which, when executed by one or more processors, cause: prior to analyzing the particular row, storing one or more rolling maximums in the at least one storage container;
wherein aggregating the data, from the particular row of the at least one database object, within the at least one storage container comprises updating the one or more rolling maximums based, at least in part, on a value from the particular row.

15. The one or more non-transitory computer-readable storage media of claim 12, wherein:
the query, when evaluated, aggregates the data by computing a minimum of data from the at least one database object; and
the instructions further comprise instructions which, when executed by one or more processors, cause: prior to analyzing the particular row, storing one or more rolling minimums in the at least one storage container;
wherein aggregating the data, from the particular row of the at least one database object, within the at least one storage container comprises updating the one or more rolling minimums based, at least in part, on a value from the particular row.

16. The one or more non-transitory computer-readable storage media of claim 12, wherein:
the at least one storage container contains one or more sequences of values, from the at least one database object, to be aggregated; and
aggregating the data, from the particular row of the at least one database object, within the at least one storage container comprises including a value, from the particular row, in the one or more sequences of values.

17. The one or more non-transitory computer-readable storage media of claim 12, wherein the query is a first query; wherein the instructions further comprise instructions which, when executed by one or more processors, cause:
retaining aggregated data in the one or more storage containers after evaluation of the first query;
determining that a second query involves at least part of the aggregated data in the one or more storage containers; and
in response to determining that the second query involves at least part of the aggregated data, using at least part of the aggregated data, from the one or more storage containers, to evaluate the second query.

18. The one or more non-transitory computer-readable storage media of claim 12 wherein the instructions further comprise instructions which, when executed by one or more processors, cause:
creating a data structure that stores the mapping data.

19. The one or more non-transitory computer-readable storage media of claim 12, wherein the instructions further comprise instructions which, when executed by one or more processors, cause using a stored mapping to map key values from the at least one database object to key values of at least one other database object of the plurality of database objects, wherein the at least one storage container is located using the key values of the at least one other database object.

20. The one or more non-transitory computer-readable storage media of claim 12, wherein the one or more storage containers are mapped to a Cartesian product of set identifiers for two or more dimensions that are referenced by the query, and wherein the at least one database object comprises a fact table.

21. The one or more non-transitory computer-readable storage media of claim 18, wherein:

the data structure comprises an array of the plurality of set identifiers, and wherein each entry in the array corresponds to a corresponding key of at least one other database object that is referenced by the query.

22. The one or more non-transitory computer-readable storage media of claim 18, wherein the instructions further comprise instructions which, when executed by one or more processors, cause:
- filtering, from the data structure, set identifiers that represent particular combinations of values that cannot satisfy the query to produce a set of remaining set identifiers; and
- wherein aggregating the data further comprises analyzing only those rows of the at least one database object that are associated with set identifiers included in the set of remaining set identifiers;
- wherein the particular row of the at least one database object is associated with a set identifier included in the set of remaining set identifiers.

23. The method of claim 7, wherein:
- a certain set identifier, of the plurality of set identifiers, is mapped, in the mapping data, to a certain key value that identifies a row storing a certain unique combination of two or more values.

24. The method of claim 7, wherein keys from the at least one database object directly identify entries in the data structure.

25. The one or more non-transitory computer-readable storage media of claim 18, wherein:
- a certain set identifier, of the plurality of set identifiers, is mapped, in the mapping data, to a certain key value that identifies a row storing a certain unique combination of two or more values.

26. The one or more non-transitory computer-readable storage media of claim 18, wherein keys from the at least one database object directly identify entries in the data structure.

* * * * *

UNITED STATES PATENT AND TRADEMARK OFFICE
CERTIFICATE OF CORRECTION

PATENT NO. : 9,740,718 B2
APPLICATION NO. : 14/033251
DATED : August 22, 2017
INVENTOR(S) : Hopeman, IV Page 1 of 1

It is certified that error appears in the above-identified patent and that said Letters Patent is hereby corrected as shown below:

In the Specification

In Column 4, Line 21, delete "SET 2." and insert -- SET2. --, therefor.

In Column 10, Lines 5-6, delete "{GE,ELECTRIC}." and insert -- {GE, ELECTRIC}. --, therefor.

In Column 10, Line 31, delete "TEMPORTARY" and insert -- TEMPORARY --, therefor.

In Column 10, Line 61, delete "TEMPORTARY" and insert -- TEMPORARY --, therefor.

Signed and Sealed this
Twenty-ninth Day of May, 2018

Andrei Iancu
*Director of the United States Patent and Trademark Office*